United States Patent
Lu

(10) Patent No.: US 7,723,927 B2
(45) Date of Patent: May 25, 2010

(54) INVERTER CIRCUIT WITH SINGLE SAMPLING UNIT AND LIQUID CRYSTAL DISPLAY WITH SAME

(75) Inventor: Jian-Hui Lu, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 87 days.

(21) Appl. No.: 12/069,876

(22) Filed: Feb. 12, 2008

(65) Prior Publication Data
US 2008/0211418 A1 Sep. 4, 2008

(30) Foreign Application Priority Data
Feb. 12, 2007 (TW) .............................. 96104975 A

(51) Int. Cl.
*H05B 37/02* (2006.01)
(52) U.S. Cl. .................. 315/307; 315/276; 315/287
(58) Field of Classification Search ............. 315/209 R, 315/210, 213, 219, 224–226, 276–277, 287, 315/291, 294, 307–308, 312; 363/21.08, 363/55, 95, 98; 345/102
See application file for complete search history.

(56) References Cited

U.S. PATENT DOCUMENTS

| | | | |
|---|---|---|---|
| 5,172,034 A * | 12/1992 | Brinkerhoff | 315/307 |
| 7,141,935 B2 | 11/2006 | Ushijima et al. | |
| 7,477,025 B2 * | 1/2009 | Teng | 315/307 |
| 2007/0002001 A1 * | 1/2007 | Park et al. | 345/102 |
| 2007/0262727 A1 * | 11/2007 | Suzuki et al. | 315/219 |
| 2008/0111496 A1 * | 5/2008 | Lee et al. | 315/277 |

* cited by examiner

*Primary Examiner*—David Hung Vu
*Assistant Examiner*—Tung X Le
(74) *Attorney, Agent, or Firm*—Wei Te Chung

(57) ABSTRACT

An exemplary inverter circuit (2) includes a full-bridge circuit (21) for converting a DC voltage into an AC low voltage, main inverse transformers (22) for converting the AC low voltage into an AC high voltage, and a feedback circuit (25). The feedback circuit includes a secondary inverse transformer (250) for converting the AC low voltage into an AC high voltage, a sampling unit (254) for sampling the AC high voltage and outputting a sampling voltage, and an integral circuit unit (205) for integrating the sampling voltage and outputting an integrated sampling voltage to the full-bridge circuit. When the AC low voltage outputted by the full-bridge circuit fluctuates, the feedback circuit sends a feedback voltage to the full-bridge circuit, and the full-bridge circuit stabilizes the AC low voltage according to the feedback voltage. The feedback voltage is in direct proportion to the fluctuation of the AC low voltage.

18 Claims, 3 Drawing Sheets

INVERTER CIRCUIT WITH SINGLE SAMPLING UNIT AND LIQUID CRYSTAL DISPLAY WITH SAME

FIELD OF THE INVENTION

The present invention relates to an inverter circuit including single sampling unit and a liquid crystal display including the inverter circuit.

GENERAL BACKGROUND

A typical LCD has the advantages of portability, low power consumption, and low radiation. The LCD has been widely used in various portable information products such as notebooks, personal digital assistants (PDAs), video cameras, and the like. However, liquid crystal in the liquid crystal display does not itself emit light. Rather, the liquid crystal has to be lit up by a light source such as a cold cathode fluorescent lamp (CCFL) so as to clearly and sharply display text and images. Generally, the CCFL needs an inverter circuit to supply working voltages.

Referring to FIG. 3, a typical inverter circuit 1 includes a full-bridge circuit 11, a plurality of inverse transformers 12, a plurality of over-voltage protective circuits 13, a plurality of CCFLs 14, and a feedback circuit 15.

The full-bridge circuit 11 includes a first output 111, a second input 112, an over-voltage protective terminal 113, and a feedback terminal 113.

Each inverse transformer 12 includes a first input 121, a second input 122, and a high voltage output 123. The first input 121 is connected to the first output 111 of the full-bridge circuit 11. The second input 122 is connected to the second output 112 of the full-bridge circuit 11. The high voltage output 123 is connected to the over-voltage protective terminal 113 of the full-bridge circuit 11 via a corresponding over-voltage protective circuit 13.

Each CCFL 14 includes a first electrode 141 and a second electrode 142. The first electrode 141 is connected to the high voltage output 123 of a corresponding inverse transformer 12. The second electrode 142 is connected to the feedback terminal 114 of the full-bridge circuit 11.

The feedback circuit 15 includes a plurality of sampling units 151 and an integral circuit unit 156. The number of the sampling units 151 is equal to the number of the CCFLs 14, and each sampling unit 151 corresponds to a respective CCFL 14. Each sampling unit 151 includes a first diode 152, a second diode 153, a third diode 154, and a first resistor 155. The cathode of the first diode 152 is connected to the second electrode 142 of the corresponding CCFL 14, and the anode of the first diode 152 is connected to ground. The anode of the second diode 153 is connected to the second electrode 142 of the corresponding CCFL 14, and the cathode of the second diode 153 is connected to ground via the first resistor 155. The anode of the third diode 154 is connected to the cathode of the second diode 153, and the cathode of the third diode 154 is connected to the integral circuit unit 156. Because of a diode's specific characteristic of one-way electrical conduction, the third diode 154 can prevent sampling voltages of other sampling units 151 from being applied to the cathode of the second diode 153 of the sampling unit 151 and affecting sampling of the sampling unit 151. The integral circuit unit 156 includes a second resistor 157, a third resistor 158, and a capacitor 159. The third resistor 158 and the capacitor 159 are connected in series, and the combination of the third resistor 158 and the capacitor 159 is connected with the second resistor 157 in parallel, thereby forming an integral circuit. The integral circuit can integrate voltages outputted by the sampling units 151, and provide integrated voltages to the feedback terminal 114 of the full-bridge circuit 11.

The full-bridge circuit 11 is configured to convert an external direct current (DC) voltage into an alternating current (AC) voltage, and output the alternating current voltage to the first and second inputs 121, 122 of the inverse transformers 12 through the first output 111 and the second output 112 respectively. The full-bridge circuit 11 pre-sets a safety voltage value and a stable voltage value. The inverse transformers 12 are configured to transform an AC low voltage into an AC high voltage, and output the AC high voltage through the high voltage outputs 123 thereof. The AC high voltage is resonated into a sinusoidal AC voltage under the action of a leakage inductance effect of the inverse transformers 12 and an equivalent capacitance effect of the over-voltage protective circuits 13 and the CCFLs 14. The sampling units 151 of the feedback circuit 15 sample the sinusoidal AC voltage at the second electrodes 142 of the CCFLs 14. The positive half periods of the sinusoidal AC voltage are taken as a sampling voltage, and the negative half periods of the sinusoidal AC voltage are connected to ground. The sampling voltage is integrated by the integral unit 156, and then is sent to the feedback terminal 114 of the full-bridge circuit 11. If the feedback voltage is greater than the stable voltage value, the full-bridge circuit 11 decreases the AC voltage outputted therefrom. If the feedback voltage is less than the stable voltage value, the full-bridge circuit 11 increases the AC voltage outputted therefrom. Thus, a voltage applied to the CCFLs 14 is stabilized.

At the same time, the sinusoidal AC high voltage is inputted to the over-voltage protective circuits 13. If the sinusoidal AC high voltage is less than the safety voltage value, a feedback voltage of the over-voltage protective circuits 13 does not affect working of the full-bridge circuit 11. If the sinusoidal AC high voltage is greater than the safety voltage value, the feedback voltage of the over-voltage protective circuits 13 switches off the full-bridge circuit 11 and thus switches off the inverter circuit 1, in order to protect the CCFLs 14.

In the inverter circuit 1, the feedback circuit 15 feeds back every voltage at the second electrodes 142 of the CCFLs 14, and the number of sampling units 151 is equal to the number of CCFLs 14. If the number of CCFLs 14 is great, the number of the sampling units 151 is correspondingly great. In such case, the structure of the inverter circuit 1 is complicated, and the cost of the inverter circuit 1 is correspondingly high.

What is needed, therefore, is an inverter circuit that can overcome the above-described deficiencies. What is also needed is a liquid crystal display employing such inverter circuit.

SUMMARY

In one preferred embodiment, an inverter circuit includes a full-bridge circuit, a plurality of main inverse transformers, and a feedback circuit. The full-bridge circuit is configured for converting an external direct current (DC) voltage into an alternating current (AC) low voltage. The main inverse transformers are configured for converting the AC low voltage into an AC high voltage. The feedback circuit includes a secondary inverse transformer, a sampling unit, and an integral circuit unit. The secondary inverse transformer is configured for converting the AC low voltage outputted by the full-bridge circuit into an AC high voltage. The sampling unit is configured for sampling the AC high voltage outputted by the secondary inverse transformer and outputting a sampling voltage. The integral circuit unit is configured for integrating the sampling voltage and outputting an integrated sampling voltage to the full-bridge circuit. When the AC low voltage outputted by the full-bridge circuit fluctuates, the feedback circuit sends a feedback voltage to the full-bridge circuit, and the full-bridge circuit stabilizes the AC low voltage according to the feedback voltage. The feedback voltage is in direct proportion to the fluctuation of the AC low voltage.

Other novel features and advantages will become more apparent from the following detailed description when taken in conjunction with the accompanying drawings.

DETAILED DESCRIPTION OF PREFERRED EMBODIMENTS

Figure 1:
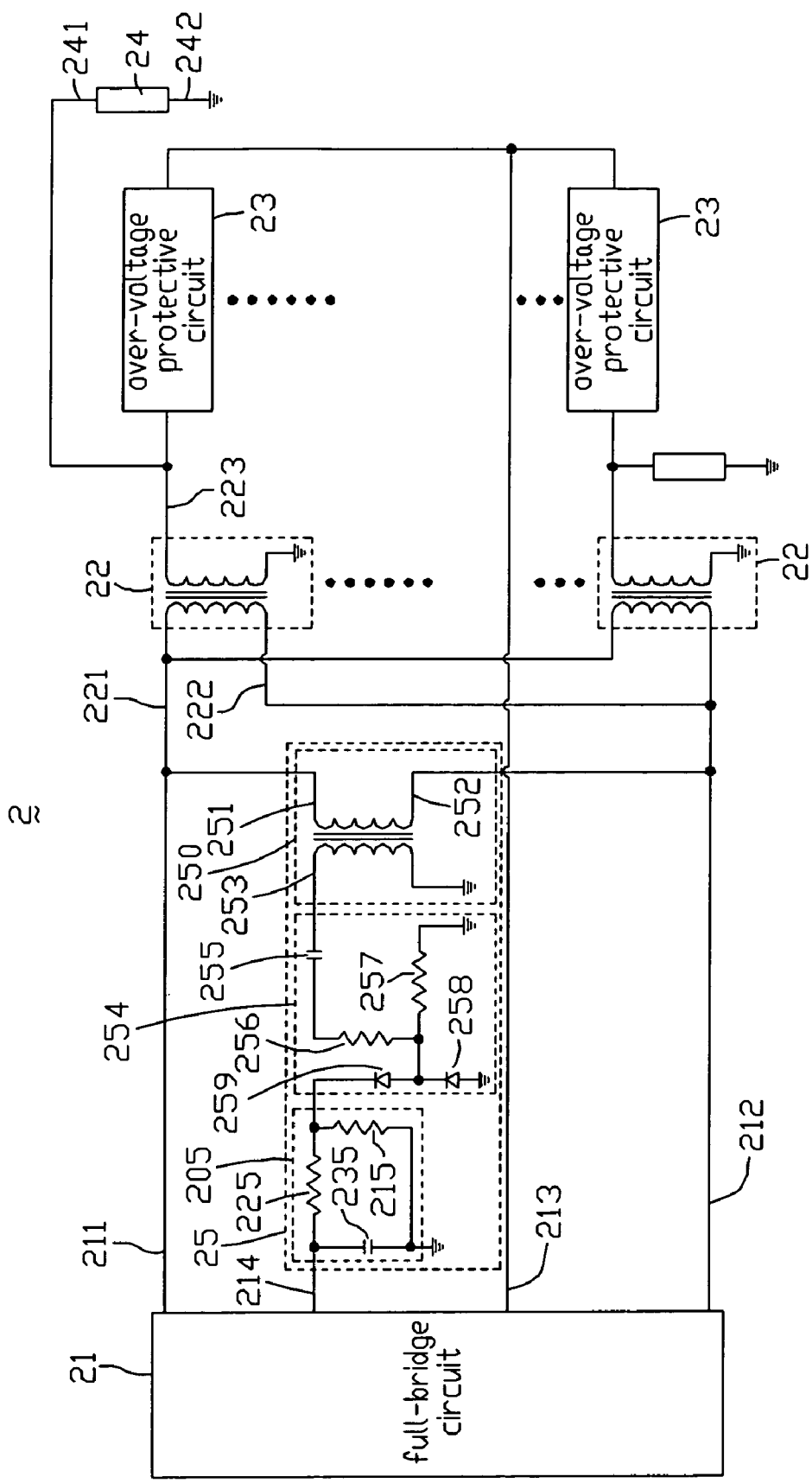
FIG. 1 is essentially an abbreviated circuit diagram of an inverter circuit according to an exemplary embodiment of the present invention.

Referring to FIG. 1, an inverter circuit 2 according to an exemplary embodiment of the present invention is shown. The inverter circuit 2 includes a full-bridge circuit 21, a plurality of main inverse transformers 22, a plurality of over-voltage protective circuits 23, a plurality of CCFLs 24, and a feedback circuit 25.

The full-bridge circuit 21 includes a first output 211, a second output 212, an over-voltage protective terminal 213, and a feedback terminal 214.

Each main inverse transformer 22 includes a first input 221, a second input 222, and a main high voltage output 223. The first input 221 is connected to the first output 111 of the full-bridge circuit 21. The second input 222 is connected to the second output 112 of the full-bridge circuit 21. The main high voltage output 223 is connected the over-voltage protective terminal 213 via a corresponding over-voltage protective circuit 23. Thus, a loop consisting of the full-bridge circuit 21, the main inverse transformer 22, and the over-voltage protective circuit 23 is formed.

Each CCFL 24 includes a first electrode 241 and a second electrode 242. The first electrode 241 is connected to the main high voltage output 223 of a corresponding main inverse transformer 22. The second electrode 242 is connected to ground.

The feedback circuit 25 includes a secondary inverse transformer 250, a sampling unit 254, and an integral circuit unit 205.

The secondary inverse transformer 250 includes a third input 251, a fourth input 252, and a secondary high voltage output 253. The third input 251 is connected to the first output 211 of the full-bridge circuit 21. The fourth input 252 is connected to the second output 212 of the full-bridge circuit 21.

The sampling unit 254 includes a first capacitor 255, a first resistor 256, a second resistor 257, a first diode 258, and a second diode 259. The secondary high voltage output 253 of the secondary inverse transformer 250 is connected to ground via the first capacitor 255, the first resistor 256, and the second resistor 257 is series, thereby forming an oscillation circuit. The second resistor 257 serves as a sampling resistor of the oscillation circuit. The cathode of the first diode 258 is connected to a node between the first resistor 256 and the second resistor 257. The anode of the first diode 258 is connected to ground. The anode of the second diode 259 is connected to the cathode of the first diode 258. The cathode of the second diode 259 outputs a sampling voltage of the sampling unit 254 to the integral circuit unit 205.

The integral circuit unit 205 includes a third resistor 215, a fourth resistor 225, and a second capacitor 235. One end of the third resistor 215 is connected to the cathode of the first diode 258, and the other end of the third resistor 215 is connected to ground. The fourth resistor 225 is connected to ground via the second capacitor 235, thereby forming an integral circuit. A node between the fourth resistor 225 and the second capacitor 235 is connected to the feedback terminal 214 of the full-bridge circuit 21. The third resistor 215 is connected with the integral circuit in parallel, and is then connected to ground. By adjusting a resistance of the third resistor 215, an output voltage of the sampling unit 254 can be adjusted, such that an output voltage of the integral circuit unit 205 can be adjusted.

The full-bridge circuit 21 includes a control chip (not shown). The control chip is configured to pre-set a safety voltage value and a stable voltage value of the CCFLs 24. The full-bridge circuit 21 is configured to convert a DC voltage into an AC low voltage. The secondary inverse transformer 250 is configured to receive the AC low voltage from the full-bridge circuit 21, convert the AC low voltage into an AC high voltage, and provide the AC high voltage to the sampling unit 254. The sampling unit 254 is configured to convert the AC high voltage into a sinusoidal AC voltage. The positive half periods of the sinusoidal AC voltage are taken as a sampling voltage, and the sampling voltage is provided to the integral circuit unit 205. The integral unit 205 is configured to integrate the sampling voltage, and feed back the integrated sampling voltage to the feedback terminal 214 of the full-bridge circuit 21. If the feedback voltage is greater than the stable voltage value, the full-bridge circuit 21 decreases the AC voltage outputted therefrom under control of the control chip. If the feedback voltage is less than the stable voltage value, the full-bridge circuit 21 increases the AC voltage outputted therefrom under control of the control chip. The full-bridge circuit 21 can output a stable voltage by adjusting the output voltage according to the feedback voltage from the feedback circuit 25, such that the inverter circuit 2 can output a stable sinusoidal AC voltage. Thus a voltage applied to the CCFLs 24 is stabilized, and the CCFLs 24 can work stably (see below).

At the same time, the main inverse transformers 22 receive the AC low voltage outputted by the full-bridge circuit 21, convert the AC low voltage into an AC high voltage, and output the AC high voltage through the main high voltage outputs 223 respectively. The AC high voltage is resonated into a sinusoidal AC high voltage under the action of a leakage inductance effect of the main inverse transformers 22 and an equivalent capacitance effect of the over-voltage protective circuits 23 and the CCFLs 24. The sinusoidal AC high voltage is applied to the first electrodes 241 of the CCFLs 24 in order to light the CCFLs 24. The over-voltage protective circuits 23 also receive the sinusoidal AC high voltage from the main inverse transformers 22. If the sinusoidal AC high voltage is less than the safety voltage value, a feedback voltage of the over-voltage protective circuits 23 is generated, and the feedback voltage does not affect working of the full-bridge circuit 21. If the sinusoidal AC high voltage is greater than the safety voltage value, the feedback voltage of the over-voltage protective circuits 23 switches off the full-bridge circuit 21 and thus switches off the inverter circuit 2, in order to protect the CCFLs 24.

Because the feedback circuit 25 is connected with the first and second outputs 211, 212 of the full-bridge circuit 21, after the secondary inverse transformer 250 converts the AC low voltage outputted by the full-bridge circuit 21 into the AC high voltage, only one sampling unit 254 is needed to sample the AC high voltage. No matter how many CCFLs 24 the inverter circuit 2 has, no extra sampling unit is required. Therefore, the structure of the inverter circuit 2 is simplified, and the cost of the inverter circuit 2 is correspondingly reduced. In addition, the feedback circuit 25 directly feeds back the AC voltage outputted by the full-bridge circuit 21, without being delayed by any resistor effect and/or capacitor effect of the CCFLs 24. Thus a high feedback efficiency is attained.

Figure 2:
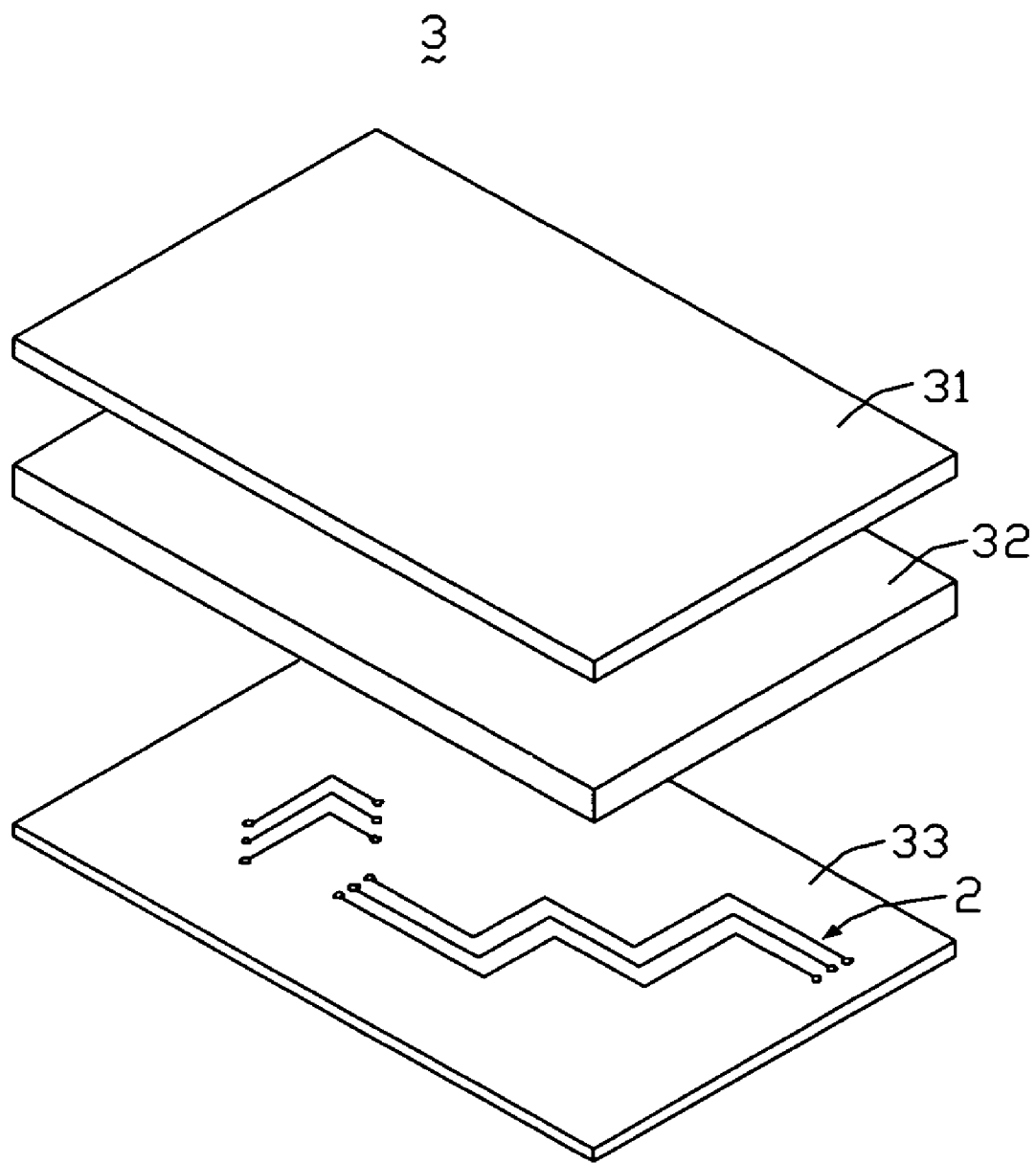
FIG. 2 is a schematic, exploded, isometric view of a liquid crystal display employing the inverter circuit of FIG. 1.
Figure 3:
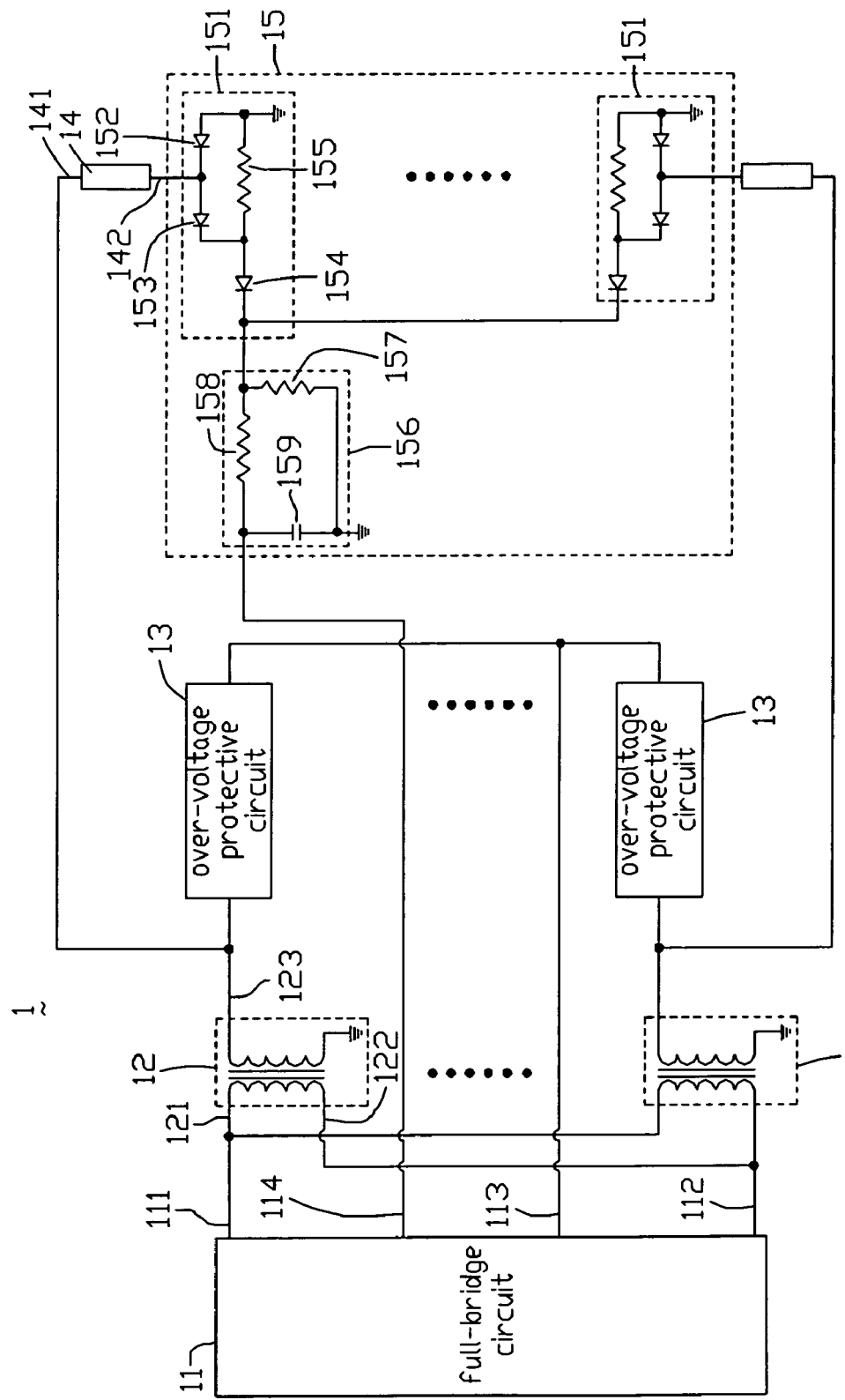
FIG. 3 is essentially an abbreviated circuit diagram of a conventional inverter circuit.

Referring to FIG. 2, a liquid crystal display 3 according to an exemplary embodiment of the present invention is shown. The liquid crystal display 3 includes a liquid crystal panel 31, a backlight module 32, and a backlight driving circuit 33. The backlight module 32 includes the CCFLs 24. The backlight driving circuit 33 includes the inverter circuit 2. The inverter circuit 2 is configured to drive the CCFLs 24.

It is to be further understood that even though numerous characteristics and advantages of the present embodiments have been set out in the foregoing description, together with details of the structures and functions of the embodiments, the disclosure is illustrative only; and that changes may be made in detail, especially in matters of shape, size, and arrangement of parts within the principles of the invention to the full extent indicated by the broad general meaning of the terms in which the appended claims are expressed.

What is claimed is:

1. An inverter circuit comprising:
a full-bridge circuit configured for converting an external direct current (DC) voltage into an alternating current (AC) low voltage;
a plurality of main inverse transformers configured for converting the AC low voltage into an AC high voltage; and
a feedback circuit comprising:
a secondary inverse transformer configured for converting the AC low voltage outputted by the full-bridge circuit into an AC high voltage;
a sampling unit configured for sampling the AC high voltage outputted by the secondary inverse transformer and outputting a sampling voltage; and
an integral circuit unit configured for integrating the sampling voltage and outputting an integrated sampling voltage to the full-bridge circuit;
wherein when the AC low voltage outputted by the full-bridge circuit fluctuates, the feedback circuit sends a feedback voltage to the full-bridge circuit, and the full-bridge circuit stabilizes the AC low voltage according to the feedback voltage, the feedback voltage being in direct proportion to the fluctuation of the AC low voltage.

2. The inverter circuit of claim 1, wherein the full-bridge circuit comprises a control chip, the control chip being configured for pre-setting a stable voltage value.

3. The inverter circuit of claim 2, wherein if the feedback voltage is greater than the stable voltage value, the full-bridge circuit decreases the AC low voltage outputted therefrom under control of the control chip, and if the feedback voltage is less than the stable voltage value, the full-bridge circuit increases the AC low voltage outputted therefrom under control of the control chip.

4. The inverter circuit of claim 2, further comprising a plurality of cold cathode fluorescent lamps, the cold cathode fluorescent lamps respectively receiving the AC high voltage from the main inverse transformers, the stable voltage value being that of the cold cathode fluorescent lamps.

5. The inverter circuit of claim 1, wherein the AC high voltage outputted by the secondary inverse transformer is less than the AC high voltage outputted by the main inverse transformers.

6. The inverter circuit of claim 1, wherein the sampling unit comprises a first capacitor, a first resistor, a second resistor, a first diode, and a second diode, the first capacitor being configured for receiving the AC high voltage from the secondary inverse transformer, and being connected to ground via the first resistor and the second resistor in series, the cathode of the first diode and the anode of the second diode being both connected to a node between the first and second resistors, the anode of the first diode being connected to ground, and the cathode of the second diode being configured for outputting the sampling voltage.

7. The inverter circuit of claim 1, wherein the integral circuit unit comprises a third resistor, a fourth resistor, and a second capacitor, one end of the third resistor and one end of the fourth resistor being both configured for receiving the sampling voltage from the sampling unit, the other end of the third resistor being connected to ground, the other end of the fourth resistor being connected to ground via the second capacitor, and a node between the fourth resistor and the second capacitor being configured for outputting the integrated sampling voltage.

8. The inverter circuit of claim 1, further comprising a plurality of over-voltage protective circuits, wherein each of the main inverse transformers, a corresponding one of the over-voltage protective circuits, and the full-bridge circuit cooperatively form a loop.

9. The inverter circuit of claim 8, wherein the AC high voltage outputted by the main inverse transformers is resonated into a sinusoidal AC high voltage under the action of a leakage inductance effect of the main inverse transformers and an equivalent capacitance effect of the over-voltage protective circuits.

10. A liquid crystal display comprising:
a liquid crystal panel;
a backlight module; and
an inverter circuit comprising:
a full-bridge circuit configured for converting an external direct current (DC) voltage into an alternating current (AC) low voltage;
a plurality of main inverse transformers configured for converting the AC low voltage into an AC high voltage; and
a feedback circuit comprising:
a secondary inverse transformer configured for converting the AC low voltage outputted by the full-bridge circuit into an AC high voltage;
a sampling unit configured for sampling the AC high voltage outputted by the secondary inverse transformer and outputting a sampling voltage; and
an integral circuit unit configured for integrating the sampling voltage and outputting an integrated sampling voltage to the full-bridge circuit;
wherein when the AC low voltage outputted by the full-bridge circuit fluctuates, the feedback circuit sends a feedback voltage to the full-bridge circuit, and the full-bridge circuit stabilizes the AC low voltage according to the feedback voltage, the feedback voltage being in direct proportion to the fluctuation of the AC low voltage.

11. The liquid crystal display of claim 10, wherein the full-bridge circuit comprises a control chip, the control chip being configured for pre-setting a stable voltage value.

12. The liquid crystal display of claim 11, wherein if the feedback voltage is greater than the stable voltage value, the full-bridge circuit decreases the AC low voltage outputted therefrom under control of the control chip, and if the feedback voltage is less than the stable voltage value, the full-bridge circuit increases the AC low voltage outputted therefrom under control of the control chip.

13. The liquid crystal display of claim 11, wherein the inverter circuit further comprises a plurality of cold cathode fluorescent lamps, the cold cathode fluorescent lamps respectively receiving the AC high voltage from the main inverse transformers.

14. The liquid crystal display of claim 10, wherein the AC high voltage outputted by the secondary inverse transformer is less than the AC high voltage outputted by the main inverse transformers.

15. The liquid crystal display of claim 10, wherein the sampling unit comprises a first capacitor, a first resistor, a second resistor, a first diode, and a second diode, the first capacitor being configured for receiving the AC high voltage from the secondary inverse transformer, and being connected to ground via the first resistor and the second resistor in series, the cathode of the first diode and the anode of the second diode being both connected to a node between the first and second resistors, the anode of the first diode being connected to ground, and the cathode of the second diode being configured for outputting the sampling voltage.

16. The liquid crystal display of claim 10, wherein the integral circuit unit comprises a third resistor, a fourth resistor, and a second capacitor, one end of the third resistor and one end of the fourth resistor being both configured for receiving the sampling voltage from the sampling unit, the other end of the third resistor being connected to ground, the other end of the fourth resistor being connected to ground via the second capacitor, and a node between the fourth resistor and the second capacitor being configured for outputting the integrated sampling voltage.

17. The liquid crystal display of claim 10, wherein the inverter circuit further comprises a plurality of over-voltage protective circuits, wherein each of the main inverse transformers, a corresponding one of the over-voltage protective circuits, and the full-bridge circuit cooperatively form a loop.

18. The liquid crystal display of claim 17, wherein the AC high voltage outputted by the main inverse transformers is resonated into a sinusoidal AC high voltage under the action of a leakage inductance effect of the main inverse transformers and an equivalent capacitance effect of the over-voltage protective circuits.

* * * * *